N. Du BRUL.
Tobacco Granulating Machine.
No. 210,191. Patented Nov. 26, 1878.
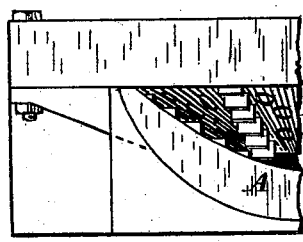
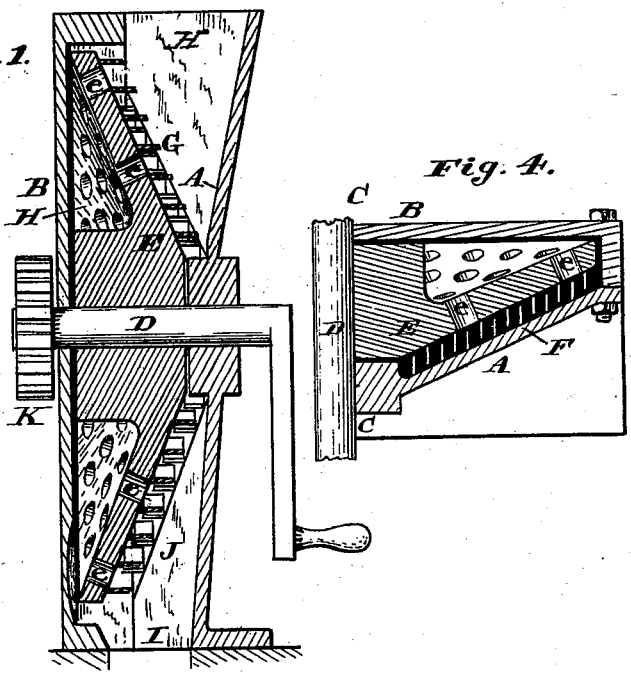
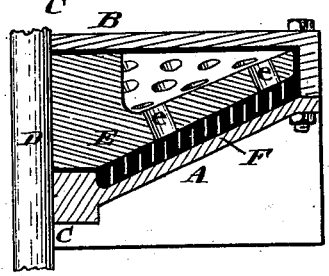
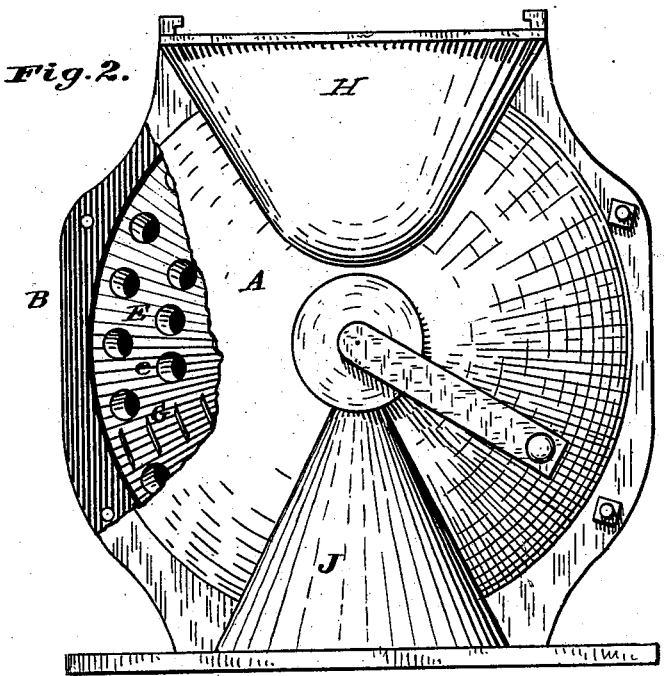
Attest.
Walter Knight
L. S. Bond
Inventor
Napoleon Du Brul
By Knight Bros.
Attys.

UNITED STATES PATENT OFFICE.

NAPOLEON DU BRUL, OF CINCINNATI, OHIO.

IMPROVEMENT IN TOBACCO-GRANULATING MACHINES.

Specification forming part of Letters Patent No. 210,191, dated November 26, 1878; application filed January 31, 1878.

*To all whom it may concern:*

Be it known that I, NAPOLEON DU BRUL, of Cincinnati, Hamilton county, Ohio, have invented a new and useful Tobacco-Scrap Machine, of which the following is a specification:

My improved scrap-machine consists, essentially, of a vertically, or nearly vertically, revolving disk, possessing a slightly crowning or obtusely conical face, armed with teeth or knives, and having numerous orifices.

My said machine further possesses a similarly-armed stationary counter-plate, whose upper portion constitutes a suitable hopper for conducting the tobacco to the breakers, where it is subjected to the conjoined action of the said armed revolving disk and armed stationary plate.

In the accompanying drawings, Figure 1 is a vertical axial section of a machine embodying my improvements. Fig. 2 is a front view, with a portion of the counter-plate broken away. Fig. 3 is a half-top view, and Fig. 4 a half-section in the horizontal plane of the axis.

A and B are two plates, which constitute, respectively, the armed counter-plate A and the supporting-plate B. These plates have each a central perforation, C, to afford journal-bearings for the horizontal shaft D of my conical rotary disk E. Both plate A and disk E are armed with several rows of blades or teeth, F and G, having such relative arrangement as to penetrate each other's interstices without cutting shearwise or actually striking one another.

The face of the plate A flares from the center upward, as shown in Fig. 1, so as to form a feeding-hopper, H, and is parallel to the disk in its horizontal section, as shown in Fig. 4.

Orifices $e$ in the disk E permit the passage therethrough of a portion of the finer scraps, which, descending the chamber H in rear of the disk, reach the discharge-aperture I without further contact with the shredding-blades. While this is taking place, the coarser or less comminuted portions fall down the chamber J, between the armed faces of the revolving disk E and stationary plate A, and are by their conjoint action reduced to the required fineness by the time they reach the discharge I.

The blades or teeth are preferably secured in the plate A and disk E, respectively, by being set in the mold in which these members are cast, and in whose substance they are consequently immovably embedded; but said blades may be fastened in any other suitable manner.

The disk E, although preferably perforated, may be imperforate, if desired.

A pinion, K, on the shaft C, for the engagement of a large spur-wheel having a suitable crank or handle, (not shown,) enables the disk to be rotated at a high speed.

The machine is intended to be surmounted by a large funnel or hopper, into which the tobacco is fed by an attendant; and the machine is usually placed upon a suitable box or pedestal supplied with a shaking sieve or screen, through which the dust falls, while the shreds are conducted out of the machine into any proper receptacle.

I am aware that it is not new, in grinding-mills, to construct the mill of hopper form, and to have immediately beneath a spout or funnel for conveying away the ground material; and I am also aware that vegetable-cutters have been constructed with a dual set of knives or cutters, one set arranged on an upper and the other set on a lower wheel or disk, and revolving in opposite directions. These features I do not claim, broadly; but What I do claim as new and of my invention is—

The tobacco-scrap machine constructed with a stationary casing-plate, A, containing the feeding-hopper H and discharge-duct J, and armed with teeth or breakers F, and a vertical convex-faced revolving disk, E, armed with teeth or breakers G, passing through the interstices between the teeth F, substantially as and for the purposes herein shown and described.

In testimony of which invention I hereunto set my hand.

NAPOLEON DU BRUL.

Attest:
  GEO. H. KNIGHT,
  L. H. BOND.